United States Patent [19]

Whelan

[11] 4,080,475

[45] * Mar. 21, 1978

[54] PROCESS OF TREATING CEREAL GRAIN

[75] Inventor: John C. Whelan, Woodland, Calif.

[73] Assignee: California Pellet Mill Co., San Francisco, Calif.

[*] Notice: The portion of the term of this patent subsequent to Aug. 21, 1990, has been disclaimed.

[21] Appl. No.: 689,921

[22] Filed: May 25, 1976

Related U.S. Application Data

[63] Continuation of Ser. No. 555,379, Mar. 5, 1975, abandoned, which is a continuation-in-part of Ser. No. 389,334, Aug. 17, 1973, abandoned.

[51] Int. Cl.² .................... A23L 1/00; A23K 1/00; A23K 1/14
[52] U.S. Cl. .................................. 426/468; 426/518
[58] Field of Search .............................. 426/468, 518

[56] References Cited

U.S. PATENT DOCUMENTS 3,796,807   3/1974   Whelan .................................. 426/468

FOREIGN PATENT DOCUMENTS 111,768     8/1965   Netherlands.
1,311,066   3/1973   United Kingdom.

*Primary Examiner*—Joseph M. Golian
*Attorney, Agent, or Firm*—Bruce & McCoy

[57] ABSTRACT

A cereal grain at ambient pressure is pre-cut and then mechanically deformed by being passed between mill rollers spaced apart about 0.002 of an inch while the grain is at its maximum plasticity at a temperature of between about 143° and 160° C and preferably at 154° C.

2 Claims, No Drawings

PROCESS OF TREATING CEREAL GRAIN

This is a continuation of application Ser. No. 555,379, filed Mar. 5, 1975 which in turn is a continuation-in-part of application Ser. No. 389,334, filed Aug. 17, 1973, both now abandoned.

Cereal grains as food stuffs have been subjected to many kinds of treatment processes in order to upgrade them so far as nutrition and digestibility is concerned. Much of the work has been accomplished in connection with the feeding of animals other than monogastric animals. These preliminary treatments have been especially designed to coact with the body chemistry of polygastric animals in order to increase the availability of the nutrients in the cereal grains for the animals. Considerably work has also been done in connection with cereal grains for consumption by humans and other monogastric animals but there still remains a good deal to be accomplished.

It is therefore a general object of this invention to provide an improved process of treatment for cereal grains to improve the adaptability of such grains for consumption by monogastric animals and particularly to improve the ability of such animals to utilize the starch available in the grain.

Another object of the invention is to provide a method of treating cereal grains which will present the natural starch thereof in a much better nutritional form for digestion and use by the animal.

A further object of the invention is to provide a cereal treatment process in which the conversion of the grain starch for human and other monogastric animal consumption involves little or no prolonged heating.

A further object of the invention is to provide a process for treating cereal grains to improve nutritional characteristics thereof without utilizing protracted cooking in water.

A further object of the invention is to provide a process for treating cereal grains to improve the starch digestibility thereof without involving the use of liquids.

A further object is in general to improve the nutritional and food characteristics of cereal grains.

Other objects will become apparent from a reading of the following specification and claims.

Cereal grains as a class are generally subject to the process of the invention, although, as is pointed out hereinbelow, the process described herein is particularly adapted to the processing of larger cereal grains such as corn and soybeans, as compared with smaller cereal grains such as wheat, barley, and milo. The present process improves on the process of treating cereal grain disclosed in Applicant's prior U.S. Pat. No. 3,796,807.

Grains ordinarily after harvest are available under ambient pressure, temperature and moisture conditions and customarily are received for treatment with a moisture content of about 9 to 11% by weight for wheat and barley and a moisture content from about 13 to 15% for milo, rice and corn.

According to the process of the present invention, whole grain received under ambient conditions is first broken into smaller parts such as by cutting or cracking. The resulting grain parts or particles are generally rough, sharp and irregular in comparison to whole grains which are characterized by a smooth and regular shape. As will be explained more fully below, the smaller size and the irregular shape of the cut grain greatly increases the effectiveness of processing the grain in the manner of the present invention. Also the smaller size of the cut grain reduces equipment costs since larger grains have heretofore required a special set of rolls for rolling the grain in the manner described below, whereas by precutting the larger grains the same rolls can be used to roll both large and small grains. This fact further eliminates the equipment shut down time required to allow different roll sets to be exchanged.

Ideally, the larger grains are cut into particles all having a size approximately equalling that of a wheat grain which is one of the smallest of the cereal grains. However, it should be noted that somewhat larger and smaller cut particles will also achieve the objects of the precutting step. In practice, it has been found that the larger grains can be suitably cut by passing the grain between rolls having six vertical corrugations per inch and six horizontal corrugations per inch. The following sieve analysis shows the size distribution of corn particles after whole corn grains are cut using rolls of this description:

| U.S. Sieve Number | Meshes to the inch | Opening | Percent Retained | Percent Passing |
|---|---|---|---|---|
| 4 | 4 | 0.185 in. | 5.2 | 94.8 |
| 6 | 6 | 0.131 in. | 48.9 | 45.9 |
| 8 | 8 | 0.093 in. | 21.0 | 24.9 |
| 14 | 12 | 0.055 in. | 11.9 | 13.0 |
| 20 | 20 | 0.0328 in. | 5.4 | 7.6 |
| 30 | 28 | 0.0232 in. | 2.2 | 5.4 |
| Bottom pan | — | — | 5.4 | — |

Whole corn will not pass through a 0.375 inch screen of government grading, thus, assuming whole corn has an average dimension of 0.4 inch, it can be seen from the below sieve analysis that 5.2% of the cut particles are 178 size, 48.9% are ⅓ size, 21% are ¼ size, 11.9% are ⅛ size, 5.4% are 1/12 size, 2.2% are 1/16 size, and that the remaining particles are fines.

The next step in treating grain according to the present process includes taking the pre-cut grain at substantially atmospheric or ambient pressure and heating it in dry condition fairly rapidly so that its temperature rises from ambient to a range from about 143° C to about 160° C. The time required under customary conditions for such heating varies with several factors including the starting temperature and the moisture content but ranges from about minute to not more than three minutes. During such heating the plasticity of the grains increases substantially so that instead of being brittle and shatterable they become pliable and plastic. It is found that the point of maximum or best plasticity occurs at about 154° C.

When the grain has achieved maximum plasticity at a temperature of about 154° C, or certainly within the range between 143° and 160° C, it is without delay and as promptly as possibly or suddenly (to avoid substantial change in its plasticity) forced or brought between a pair of rolling mill rolls spaced apart or set at a spacing of about 0.002 of an inch. The grain in passing between such rolls and because it is plastic, deforms into a new shape without any substantial splintering or shattering and so without material production of undesired fines. During the passage of the hot, plastic grain between the rolls, the structure of the starch therein is disrupted and is made mechanically more nearly suitable for consumption by humans as well as by other monogastric animals. Preferably, the rolls themselves are heated to substantially 154° C and are so maintained because it is of importance that the grain be kept at this temperature for maximum plasticity, but it is also important that the duration of such elevated temperature be as short as possible.

The rolling step of Applicant's new process is presently achieved by utilizing rolls having 18 corrugations per inch with the corrugations being arranged either axially or angled from the roll axis up to 22° from one end of the roll to the other. The corrugations may have either a saw tooth or stevens cross-sectional shape and the roll spacing described above is understood to mean peak to peak spacing. As has been noted, one of the advantages of pre-cutting larger grains prior to rolling is to eliminate the need to utilize a special set of rolls for rolling larger grains. This is because whole large grain will not pass through rollers having 18 corrugations per inch at a commercially feasible rate of speed, and, therefore, heretofore large grains have been rolled with rolls having only 10 corrugations per inch. By pre-cutting, large grains such as corn, as well as small grains, can be rolled between rolls having 18 corrugations per inch.

It should be noted that prior to Applicant's invention it was believed that pre-cutting large grains would destroy the structural integrity and nutritional quality of the grain. Therefore, processing large whole grains with special rolls was considered to be necessary. Applicant has found the contrary to be true. He has found that by processing pre-cut large grains using rolls having a greater number of corrugations per inch there is an increase in the effectiveness of the rolling step in achieving the desired distruction of the starch structure of the grain. He has also found that the irregularly shaped particles of the cut grain are more easily grasped by the roll corrugations than are the smooth whole grains, which fact increases the overall efficiency of the process.

Grain which has been treated in this fashion has been checked for its digestibility by test with monogastric animals and also by laboratory tests, which in the past have proven reliable. For example, the principal test used is described on page 26 of an article in the Jan. 11, 1969, issue of "Feedstuffs," Vol. 41, No. 2. Such as test utilizes as a standard or control the same grain cooked in water in the usual way to provide a porridge. During that cooking the starch consistency is changed. By means of pancreatic enzymes, the digestibility of the present product has been compared with that of the indicated porridge made from the same grain. Both the present product and the same grain porridge are left with the enzyme for 30 minutes at 39° C. When heated and crushed at 154° C the product is 100% as digestible as the porridge. When heated and crushed at 143° C, the product is 94% as digestible as the porridge. When heated and crushed at 133° C, the product is 80% as digestible as the porridge and when heated and crushed at 118° C, the product is only 63% as digestible as the porridge.

In addition to the reduction in digestibility, as measured by the standard test, with reduction in initial heating temperature, it is also found that the plasticity is markedly lowered when the treatment temperature is below the indicated range. If the plasticity is sufficiently low, the grain shatters when it is rolled. This is undesirable because it results in a large proportion of unwanted, fine, sharp particles as an end product, rather than in relatively large, discreet, rounded or smooth shapes of the grain.

It is also found that if the initial heating temperature is raised a little above 154° C, there is no particular benefit so far as digestibility is concerned, although shattering is somewhat lessened. On the other hand, if the heating is only to a temperature substantially below 154° C there is materially less digestibility, as indicated above, and the shattering is likewise increased.

At a large increase in temperature above about 154° C, the plasticity is again reduced and shattering may actually be increased, this time probably because there is a substantial expulsion of moisture. Furthermore, treatment well above the indicated temperature range tends to cause an undesirable roasting or caramelization of the grain which, to most tastes, effects an adverse palatability. In addition, at substantially higher temperatures there is a slight tendency for lowered digestibility, probably through the formation of pyrodestrins.

In some grains, particularly sorghum vulgare-milo, treatment within the indicated temperature range is satisfactory but if the temperature range substantially exceed the indicated range, then the waxy coat of the milo melts and causes an agglomeration which interferes with processing.

As a result of the indicated process, it is possible to afford a dry cereal grain product for monogastric animal consumption without wetting the grain or subjecting it to a long boiling or porridge operation and with a very short heating and roller treatment time at a moderate temperature, the results being to produce a dry product which is, as indicated, of a digestibility comparable to that of the customary porridge.

Although the process of the present invention has been described above in considerable detail, it is not intended that the above description limit any obvious extensions of the invention except as may be necessitated by the appended claims.

What I claim is:

1. A process for treating cereal grain comprising the steps of
    (a) taking cereal grain received after harvest which is at ambient pressure, temperature and moisture conditions and cutting it into smaller parts;
    (b) heating the grain so cut for 1 to 3 minutes to a temperature from about 143° to 160° C;
    (c) subjecting said grain heated at said temperature to passage between rotating rolls of a roller mill wherein said rolls of said roller mill are spaced apart approximately 0.002 inches; and
    (d) permitting the products discharged from the rolls to resume ambient pressure and temperature.

2. The process according to claim 1 wherein said grain is cut by passage of the grain between rotating cutting rolls having six horizontal corrugations per inch and six vertical corrugations per inch.

* * * * *